US008479772B2

(12) United States Patent
Petrovic et al.

(10) Patent No.: US 8,479,772 B2
(45) Date of Patent: Jul. 9, 2013

(54) ROTARY THREE-WAY DIVERTER VALVE

(75) Inventors: John E. Petrovic, Hillsdale, MI (US); Peter Dabrowski, Macomb, MI (US)

(73) Assignee: Masco Corporation of Indiana, Indianapolis, IN (US)

( * ) Notice: Subject to any disclaimer, the term of this patent is extended or adjusted under 35 U.S.C. 154(b) by 2143 days.

(21) Appl. No.: 11/311,828

(22) Filed: Dec. 19, 2005

(65) Prior Publication Data

US 2006/0131445 A1 Jun. 22, 2006

Related U.S. Application Data

(60) Provisional application No. 60/637,373, filed on Dec. 17, 2004.

(51) Int. Cl.
*F16K 11/07* (2006.01)
*F16K 11/065* (2006.01)
*B05B 1/18* (2006.01)

(52) U.S. Cl.
USPC .... 137/625.48; 239/443; 239/569; 239/581.1

(58) Field of Classification Search
USPC .................. 137/625.48, 625.4; 239/390, 396, 239/436, 443, 444, 447, 569, 581.1, 581.2, 239/582.1, 583; 251/251, 259
See application file for complete search history.

(56) References Cited

U.S. PATENT DOCUMENTS 769,429 A 9/1904 Caldwell
1,081,688 A 12/1913 Mohl
1,187,245 A 6/1916 Bjerke
2,075,600 A 3/1937 Baker
2,313,631 A 3/1943 Downey
2,354,582 A 7/1944 Downey
2,441,253 A 5/1948 Sarver
2,534,577 A 12/1950 Courtot
2,891,732 A 6/1959 Orter et al.
3,112,073 A 11/1963 Larson et al.
3,403,700 A 10/1968 Meynell
3,661,182 A * 5/1972 Loveless .................. 137/625.48
3,731,905 A 5/1973 Piet
3,967,783 A 7/1976 Halsted et al.
4,203,551 A 5/1980 Levine
4,385,641 A 5/1983 Albertin et al.
4,568,060 A 2/1986 Sud
4,681,140 A 7/1987 Hayman
4,865,078 A 9/1989 Ensign
4,884,595 A 12/1989 Grove
4,903,897 A 2/1990 Hayes (Continued)

*Primary Examiner* — Darren W Gorman
(74) *Attorney, Agent, or Firm* — Carlson, Gaskey & Olds, PC

(57) ABSTRACT

A diverter valve receives fluid from an inlet port. A camshaft is rotated within a housing to slide a cam follower along an axis to regulate fluid flow to an outlet port when the camshaft is rotated. The housing provides an inlet port and first and second outlet ports. The camshaft includes a cam lobe that is offset relative to a rotational axis of the camshaft. The cam follower is supported on the cam lobe and is movable along a longitudinal axis to selectively block at least one of the first and second ports. In one embodiment, first and second cam followers are used to selectively block outlet ports that are arranged approximately 90 degrees from one another. The first and second cam followers move in first and second directions transverse to one another. In another embodiment, a single cam follower is used to regulate flow through two outlet ports that are arranged approximately 180 degrees from one another.

4 Claims, 7 Drawing Sheets

U.S. PATENT DOCUMENTS

| | | | |
|---|---|---|---|
| 4,947,886 | A | 8/1990 | Grove |
| 4,991,569 | A | 2/1991 | Martin |
| 5,085,245 | A | 2/1992 | Grove |
| 5,160,093 | A | 11/1992 | Battaglia |
| 5,165,456 | A | 11/1992 | Woolman |
| 5,188,149 | A | 2/1993 | Williams |
| 5,230,106 | A | 7/1993 | Henkin et al. |
| 5,241,714 | A | 9/1993 | Barry |
| 5,310,162 | A | 5/1994 | Baumann |
| 5,441,080 | A | 8/1995 | Baumann |
| 5,713,850 | A | 2/1998 | Heilmann et al. |
| 5,788,160 | A | 8/1998 | Woog |
| 6,032,877 | A | 3/2000 | Kagan |
| 6,123,094 | A | 9/2000 | Breda |
| 6,227,456 | B1 | 5/2001 | Colman |
| 6,230,989 | B1 | 5/2001 | Haverstraw et al. |
| 6,454,186 | B2 | 9/2002 | Haverstraw et al. |
| 6,618,872 | B1 | 9/2003 | Fan |
| 6,708,726 | B2 | 3/2004 | Hashimoto |
| 2002/0179164 | A1 | 12/2002 | Hashimoto |
| 2003/0056287 | A1 | 3/2003 | Petrovic |
| 2003/0121993 | A1 | 7/2003 | Haverstraw et al. |
| 2003/0150495 | A1 | 8/2003 | Hara |
| 2003/0208843 | A1 | 11/2003 | Schrag |
| 2003/0226200 | A1 | 12/2003 | Charonis |
| 2004/0124281 | A1 | 7/2004 | Leung |

* cited by examiner

ROTARY THREE-WAY DIVERTER VALVE

This invention claims priority to U.S. Provisional Application No. 60/637,373 filed on Dec. 17, 2004.

BACKGROUND OF THE INVENTION

The present invention relates to a diverter valve for directing fluid from an inlet to multiple outlets, and in particular, to a rotary three-way converter valve for use in a shower assembly having a fixed shower head and a hand-held shower wand.

Diverter valves typically used for shower assemblies include either a rotary or push-pull mechanism actuatable by the user. The push-pull diverter valves use longitudinal movable seal members to isolate between various flow paths. Such valves are not inherently intuitive to users.

Typical rotary diverter valves utilize a seal that is mounted on a shaft rotatable about an axis to isolate the fluid paths. In particular, the seal is used to block one of two outlet ports. The seal can be arranged between the outlet ports so that fluid from the inlet exits both outlet ports. Rotating the shaft drags the seal across the sealing surface of the housing thereby wearing the seal. Over time, the worn seal does not sufficiently block the outlet ports thereby permitting leaks.

What is needed is a diverter valve that is both intuitive to the user and has improved wear.

SUMMARY OF THE INVENTION

The present invention provides a diverter valve that receives fluid from an inlet port. A camshaft is rotated to slide a cam follower along a longitudinal axis to regulate fluid flow to an outlet port when the camshaft is rotated. A knob connected to the camshaft is rotated to point to the outlet from which flow is desired.

The housing provides an inlet port and first and second outlet ports. The camshaft includes a cam lobe that is offset relative to a rotational axis of the camshaft. The cam follower is supported on the cam lobe and is movable along a longitudinal axis to selectively block at least one of the first and second ports. In one embodiment, a pair of cam followers are used to selectively block outlet ports that are arranged approximately 90 degrees from one another. First and second cam followers respectively move in first and second directions transverse from to another. In one example, a seal is carried by each cam follower. The seals are not dragged across a sealing surface as with the prior art, but rather moved linearly into and out of engagement with the sealing surface.

Accordingly, the present invention provides a diverter valve that is both intuitive to the user and is not subject to premature wear.

These and other features of the present invention can be best understood from the following specification and drawings, the following of which is a brief description.

DETAILED DESCRIPTION OF THE PREFERRED EMBODIMENT

Figure 1:
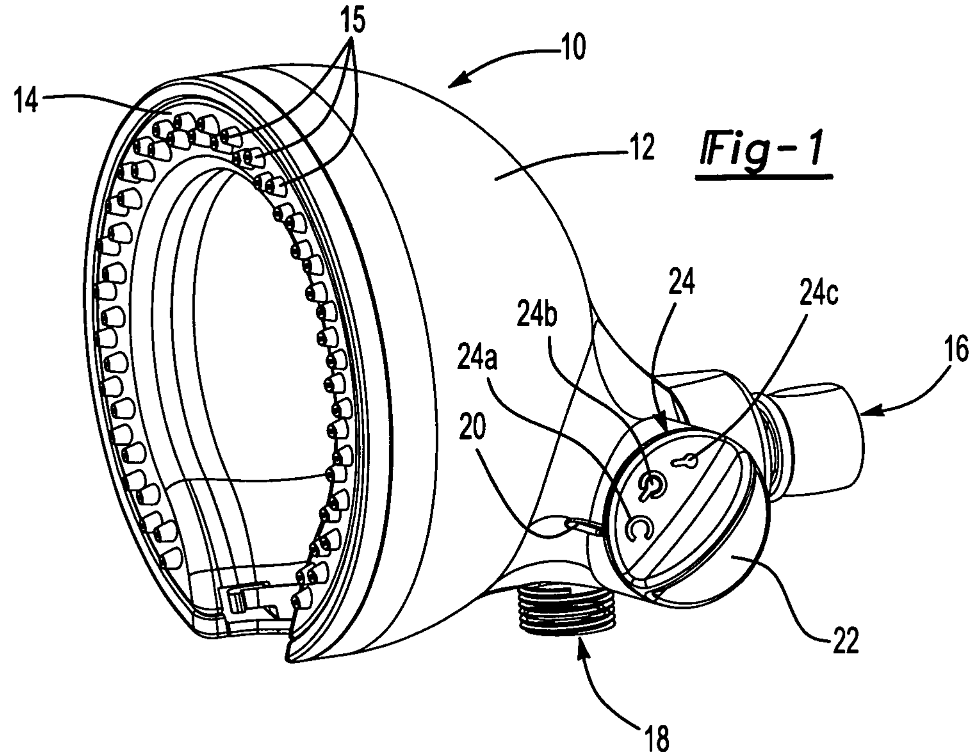
FIG. 1 is a side perspective view of a shower head incorporating the inventive diverter valve.
Figure 2:
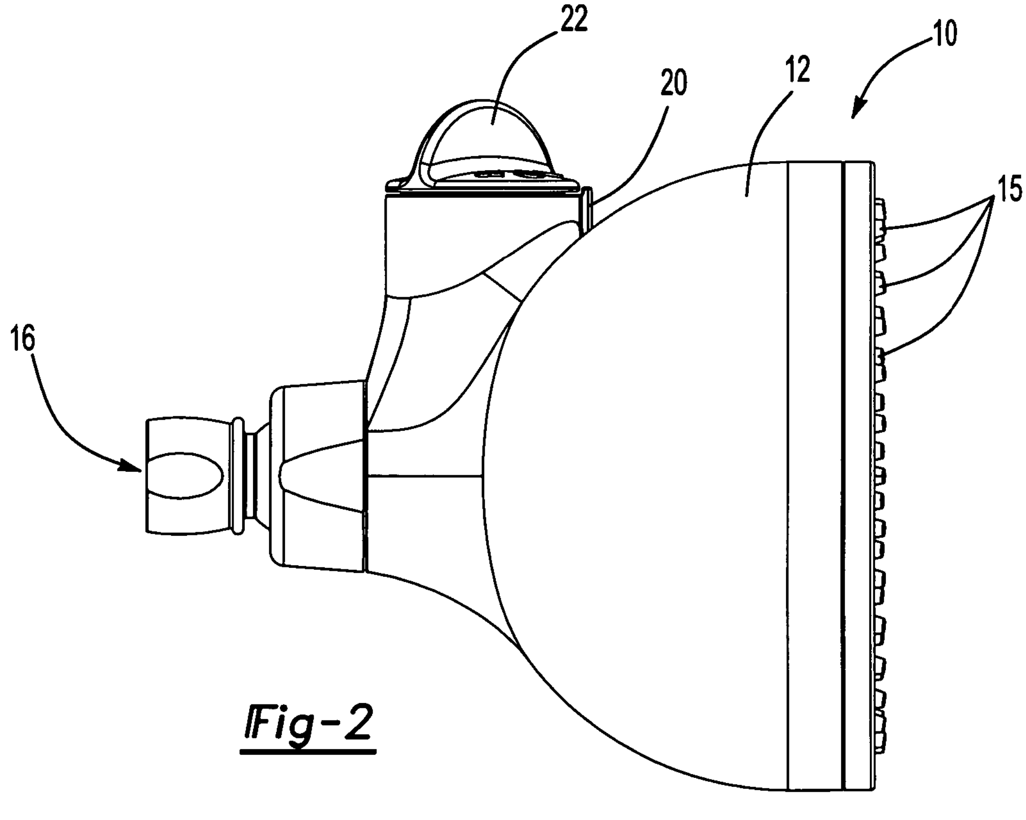
FIG. 2 is a top elevational valve of the shower head shown in FIG. 1.
Figure 3:
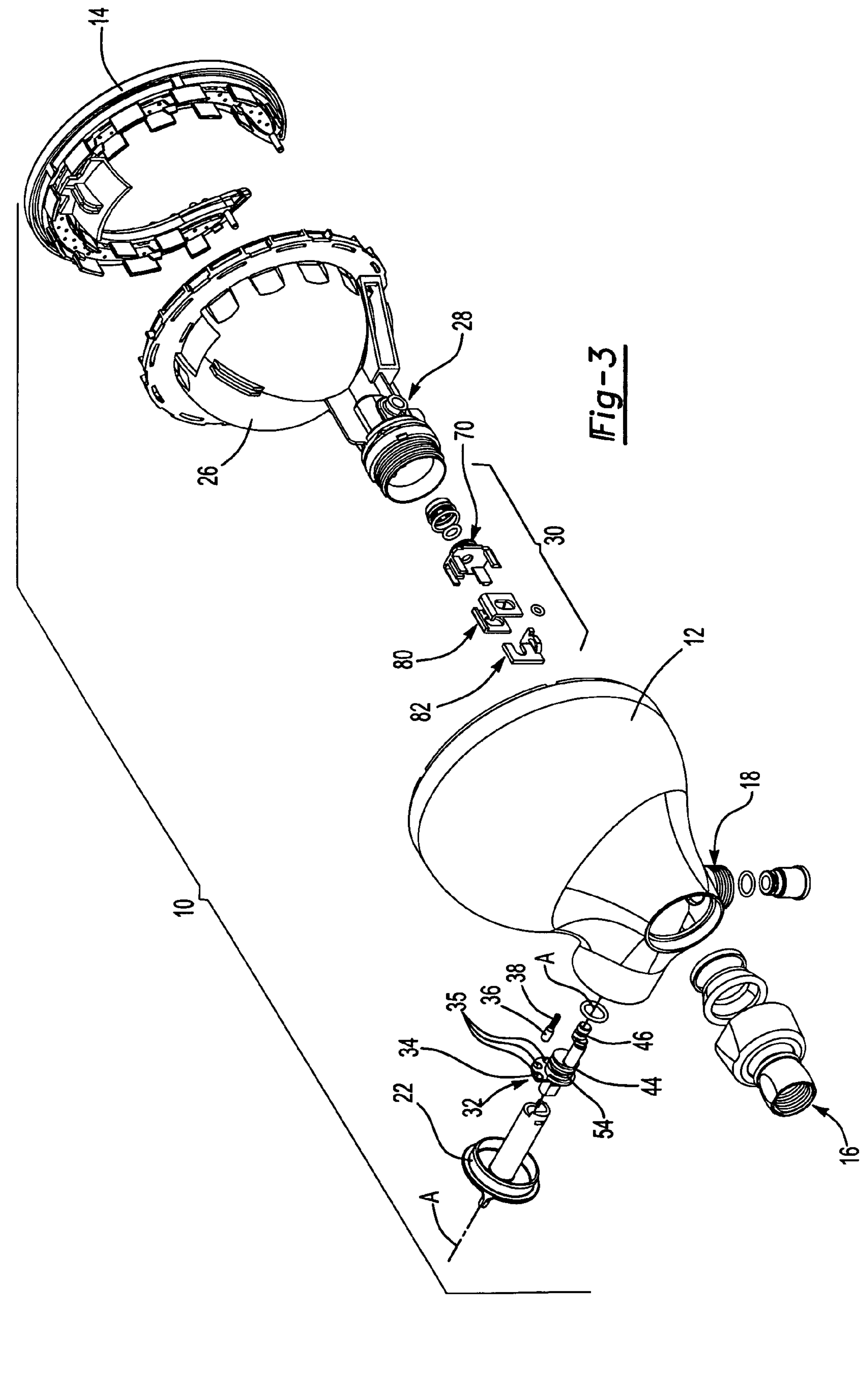
FIG. 3 is an exploded perspective view of the shower head shown in FIG. 1 including the inventive diverter valve.

A shower head 10 is shown in FIGS. 1-3 illustrating a diverter valve according to the present invention. The shower head 10 includes an outer housing 12 having a cover 14 providing multiple spray nozzles 15. Water is provided to the shower head 10 by an inlet port 16. An outlet port 18 provides water from the inlet port 16, and may be used for a hand-held shower wand.

The diverter valve is actuated using an operating member or knob 22. The knob 22 includes indicia 24 that are aligned with an indicator 20 in response to rotation of the knob 22. For example, an indicia **24*a* corresponds to water flow to the shower head only. An indicia 24*b* corresponds to water flow to both the shower head and the hand-held shower wand, and indicia 24*c*** corresponds to water flow to the hand-held shower wand only.

In the example shown, the knob 22 is rotated between 270 (9 o'clock) and 360 (12 o'clock) degree positions for a total of 90 degrees of rotation. The outlet ports are located in the 90 and 180 degree positions. When operating in this range and with the knob 22 rotated to align the indicia **24*b* with the indicator 20** to a midrange position of 315 degrees, the shower head and hand-held shower wand outlet ports are open 70% based upon the geometric relationship of the diverter valve components. By way of contrast, if the knob were to be rotated between positions other than 270-360 degrees to the other midrange positions (45, 135, and 225 degrees), for example, the outlets ports would only be open 30%.

Figure 3A:
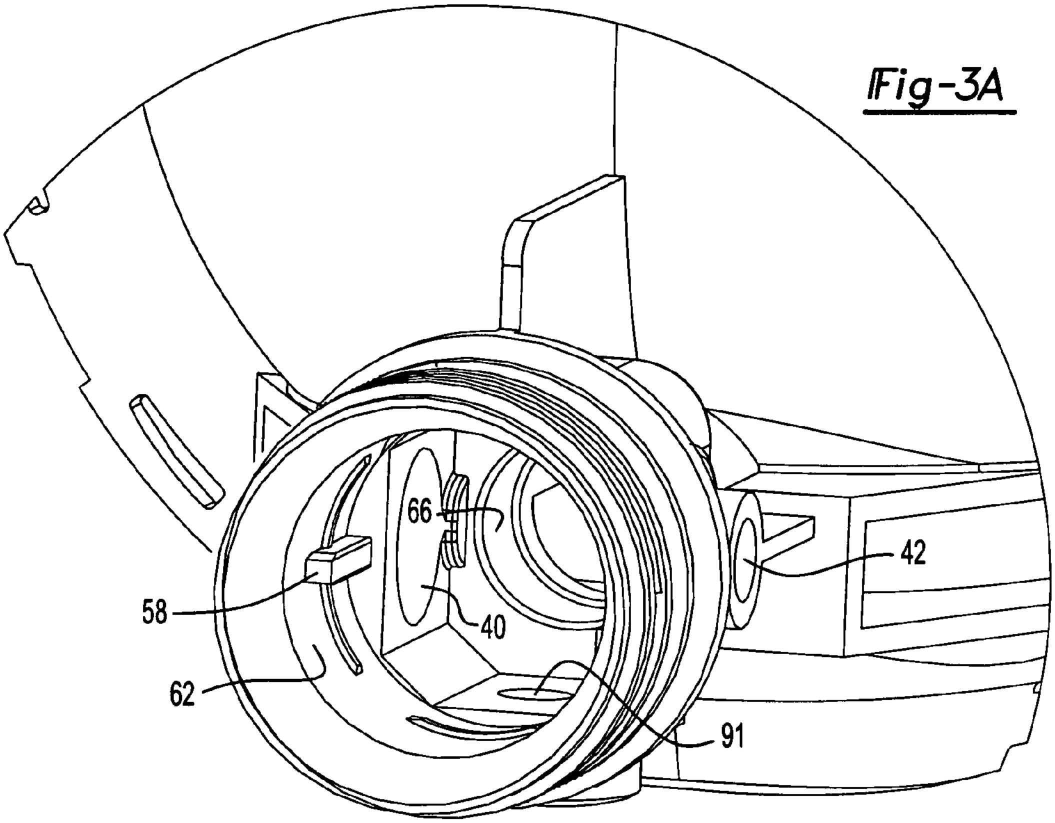
FIG. 3A is a perspective view of a valve body or housing supporting the inventive diverter valve.
Figure 3B:
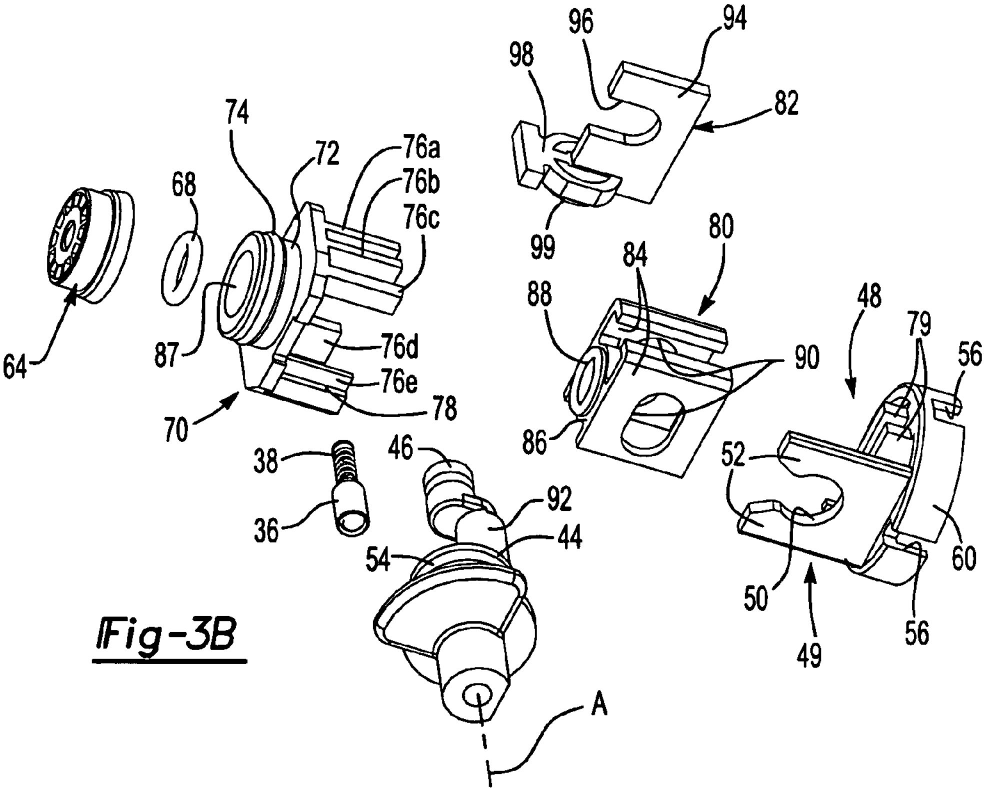
FIG. 3B is an enlarged exploded perspective view of the diverter valve.

Referring to FIGS. 3, 3A and 3B, the shower head 10 also includes an inner spray chamber 26 that provides a valve body or housing 28. The hole 66 (see FIG. 3A) provides another outlet port supplying water to the spray nozzles 15. The inventive diverter valve 30 is arranged within a cavity in the housing 28. The camshaft 32 is connected to the knob 22 and rotates about a rotational axis A. The camshaft 32 supports a plate 34 having multiple depressions 35 corresponding to the number of indicia 24. A detent 36 is biased by a spring 38 into engagement with the plate 34 and is seated in the depressions 35 when one of the indicia **24*a*, 24*b* and 24*c* is aligned with the indicator 20. The inner spray chamber 26 includes first and second holes 40 and 42 that receive large and small bearing surfaces 44 and 46 respectively of the camshaft 32**.

Referring to FIG. 3B, a lock 48 includes a tab 49 having arms 52 providing an aperture 50. A recess 54 in the large bearing surface 44 receives the arms 52. The lock 48 is used to locate components of the diverter valve 30 within the housing 28. The lock 48 includes slots 56 that cooperate with protrusions 58 provided by the housing 28, which prevents rotation of the lock 48. The lock 48 also includes an outer surface 60 that is supported by a surface 62 in the housing 28.

A flow control regulator 64 is received in the hole 66 in the housing 28. A seal 68 is supported by the flow control regulator 64 and deforms under increasing pressure to restrict flow. A guide 70 is arranged in the cavity and includes an end 72 that supports a seal 74 that is received with in the hole 66. Multiple legs 76*a*, 76*b*, 76*c*, 76*d* and 76*e* extend longitudinally from the guide 70 toward the lock 48. First and second cam followers 80 and 82 are arranged between the guide 70 and the lock 48. In the example shown, the first cam follower 80 moves horizontally to selectively block an opening 87 in the guide 70, which is in fluid communication with a first outlet port providing fluid flow to the nozzles 15 via hole 66. The second cam follower 82 moves vertically to selectively block an opening 91, which is in fluid communication with a second outlet port that provides fluid flow to the hand-held shower wand.

The first cam follower 80 includes spaced apart members 84 that are arranged outside of the legs 76*a* and 76*b* and inside the legs 76*d* and 76*e*. The tab 49 is supported by a ledge 78 that is provided by the leg 76*e*, in the example shown. Locators 79 extending from the lock 48 are arranged between the spaced apart members 84. A blocking member 86 is supported by the spaced apart members 84 and includes a seal 88 that selectively engages the guide 70 to block fluid flow through the opening 87.

The first cam follower 80 includes elongated apertures 90 in the spaced apart members 84 that are supported on a cam lobe 92 of the camshaft 32. The elongated apertures 90 accommodate rotation of the cam lobe 92, which is offset relative to the rotational axis A so that the first cam follower 80 can move in a linear fashion along a longitudinal axis that corresponds with the opening 87, in the example shown.

The second cam follower 82 includes a guide member 94 having an elongated aperture provided by a slot 96. The slot 96 receives the cam lobe 92. The guide member 94 is slidingly received between the locators 79 and the legs 76*a* and 76*b*. The cam follower 82 moves linearly in a vertical fashion in response to rotation of the camshaft 32 corresponding to a longitudinal axis provided by the opening 91, in the example shown. The guide member 94 supports a blocking surface 98 having a seal 99 that engages a surface of the housing 28 around the opening 91.

Figure 4A:
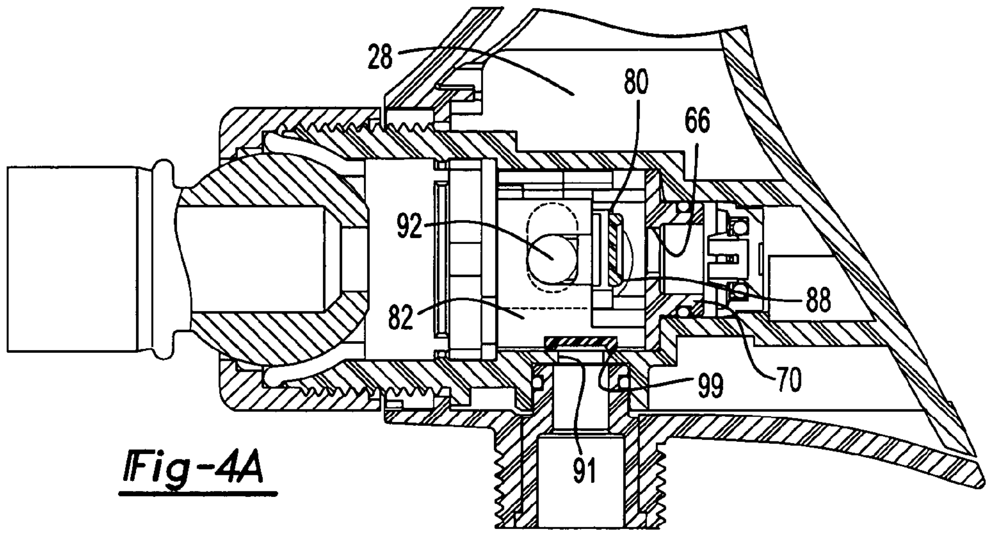
FIG. 4A is a cross-sectional view with the diverter valve in a position permitting flow to the shower head and blocking flow to the hand-held shower wand.

FIG. 4A depicts the position of the diverter valve 30 with the outlet port to the shower open and the outlet port to the hand-held shower wand blocked. Specifically, the first cam follower 80 is spaced from the opening 66, and the second cam follower 82 engages the sealing surface surrounding the opening 91.

Figure 4B:
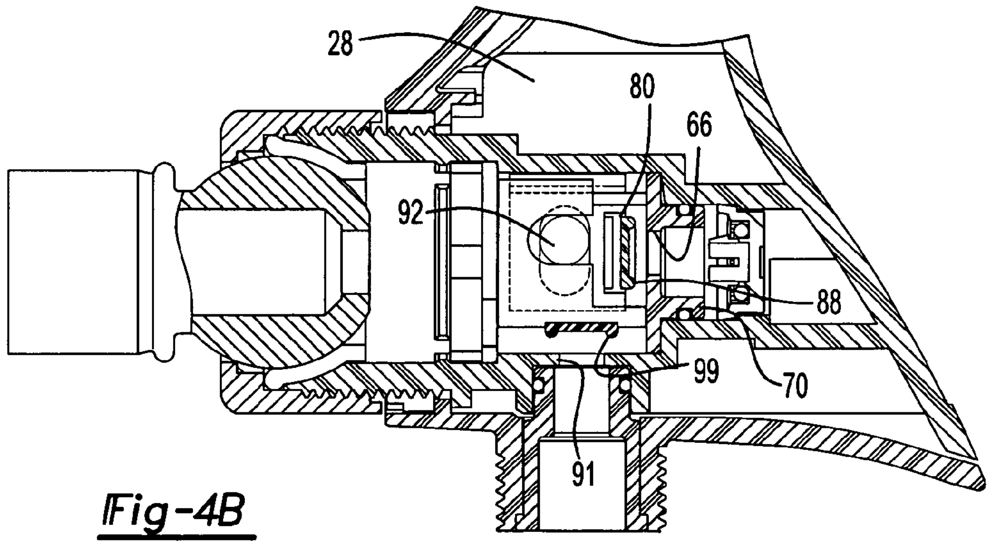
FIG. 4B is a cross-sectional view of the diverter valve in a position permitting flow to both the shower head and hand-held shower wand.

FIG. 4B depicts the diverter valve 30 in a position permitting fluid flow to both outlet ports. In this position, the first and second cam followers 80 and 82 are respectively spaced from the openings 66 and 91.

Figure 4C:
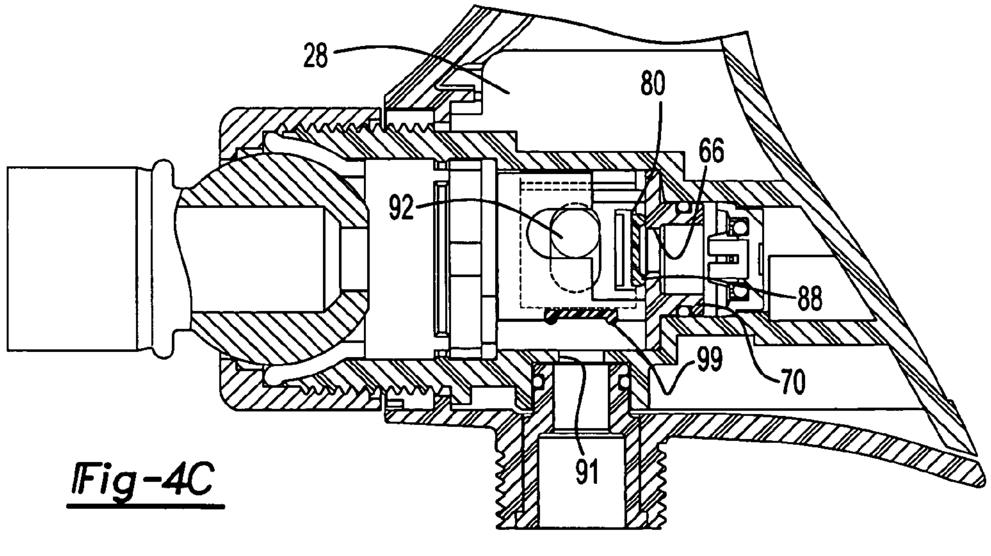
FIG. 4C is a cross-sectional view of the diverter valve in a position permitting flow to the hand-held shower wand and blocking flow to the shower head.
Figure 5:
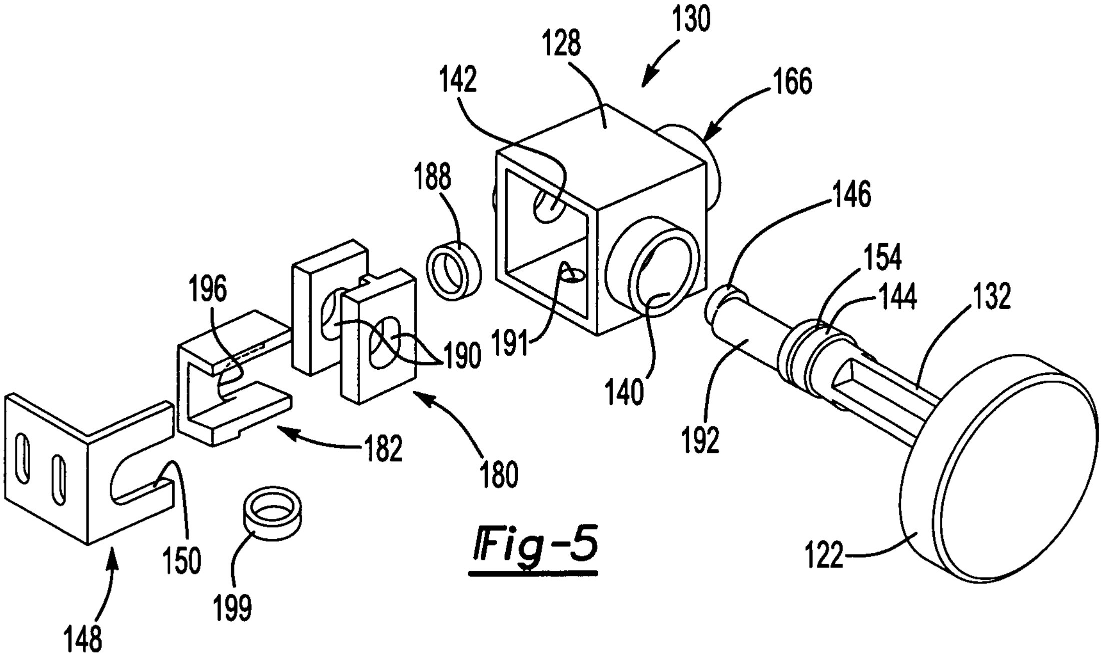
FIG. 5 is an exploded perspective view of another diverter valve.

FIG. 4C depicts the diverter valve 30 in a position blocking the outlet port to the shower and permitting fluid flow to the outlet port for the hand-held shower wand. The first cam follower 80 engages the sealing surface surrounding the opening 66, and the second cam follower 82 is spaced from the opening 91.

Figure 6A:
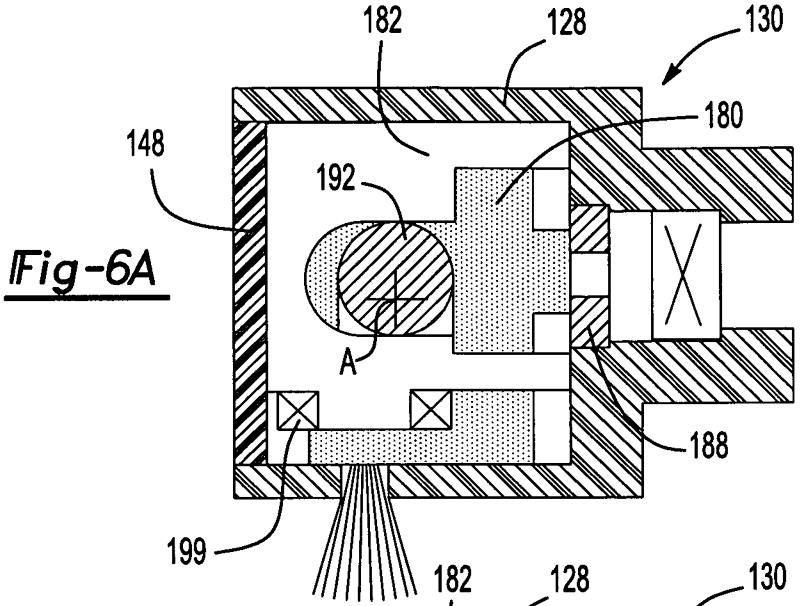
FIG. 6A is a cross-sectional view of the diverter valve shown in FIG. 5 blocking flow to a first outlet port and permitting flow to a second outlet port.
Figure 6B:
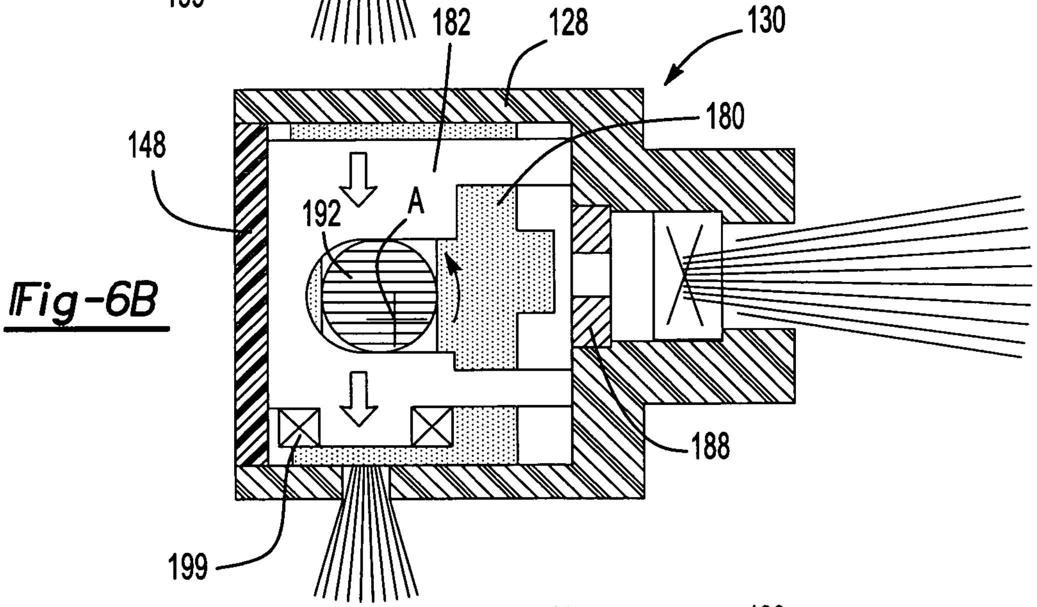
FIG. 6B is a cross-sectional view of the diverter valve shown in FIG. 5 in a position permitting fluid flow to both the first and second outlet ports.
Figure 6C:
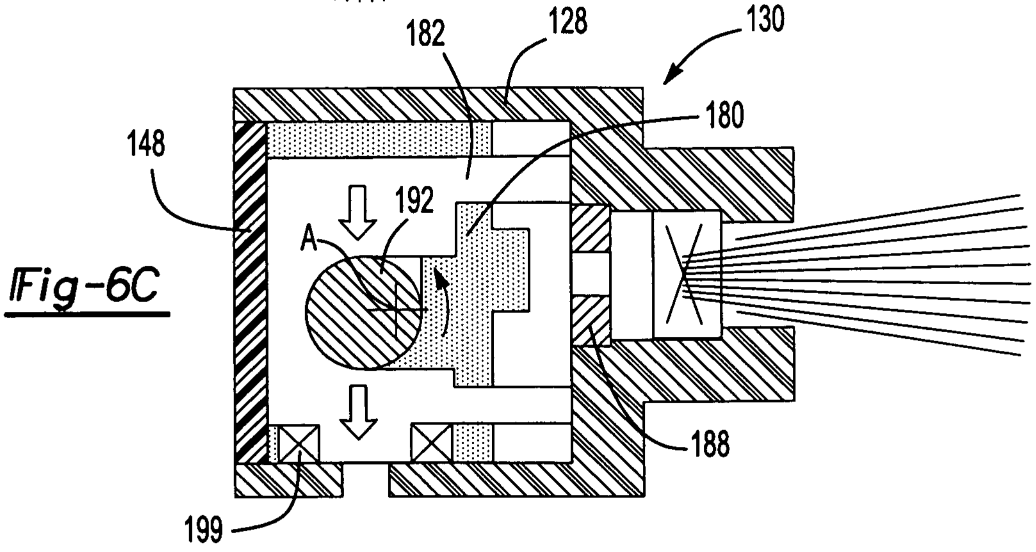
FIG. 6C is a cross-sectional view of the diverter valve shown in FIG. 5 in a position permitting fluid flow to the first outlet port and blocking flow to the second outlet port.

Another, stand alone diverter valve 130 is shown in FIG. 5 and FIGS. 6A-6C. Like numerals are used in the Figures for like elements previously discussed. FIG. 6A depicts the diverter valve 130 blocking flow to a first outlet port and permitting flow to a second outlet port. FIG. 6B depicts the diverter valve 130 in a position permitting fluid flow to both the first and second outlet ports. FIG. 6C depicts the diverter valve 130 in a position permitting fluid flow to the first outlet port and blocking flow to the second outlet port.

Figure 7:
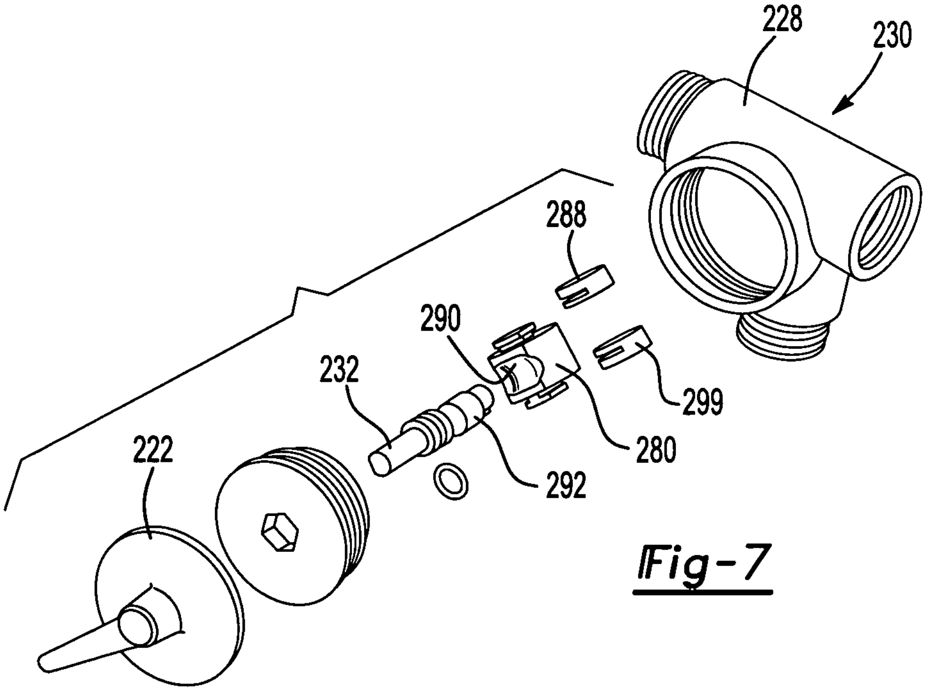
FIG. 7 is an exploded perspective view of another example diverter valve using a single cam follower.
Figure 8:
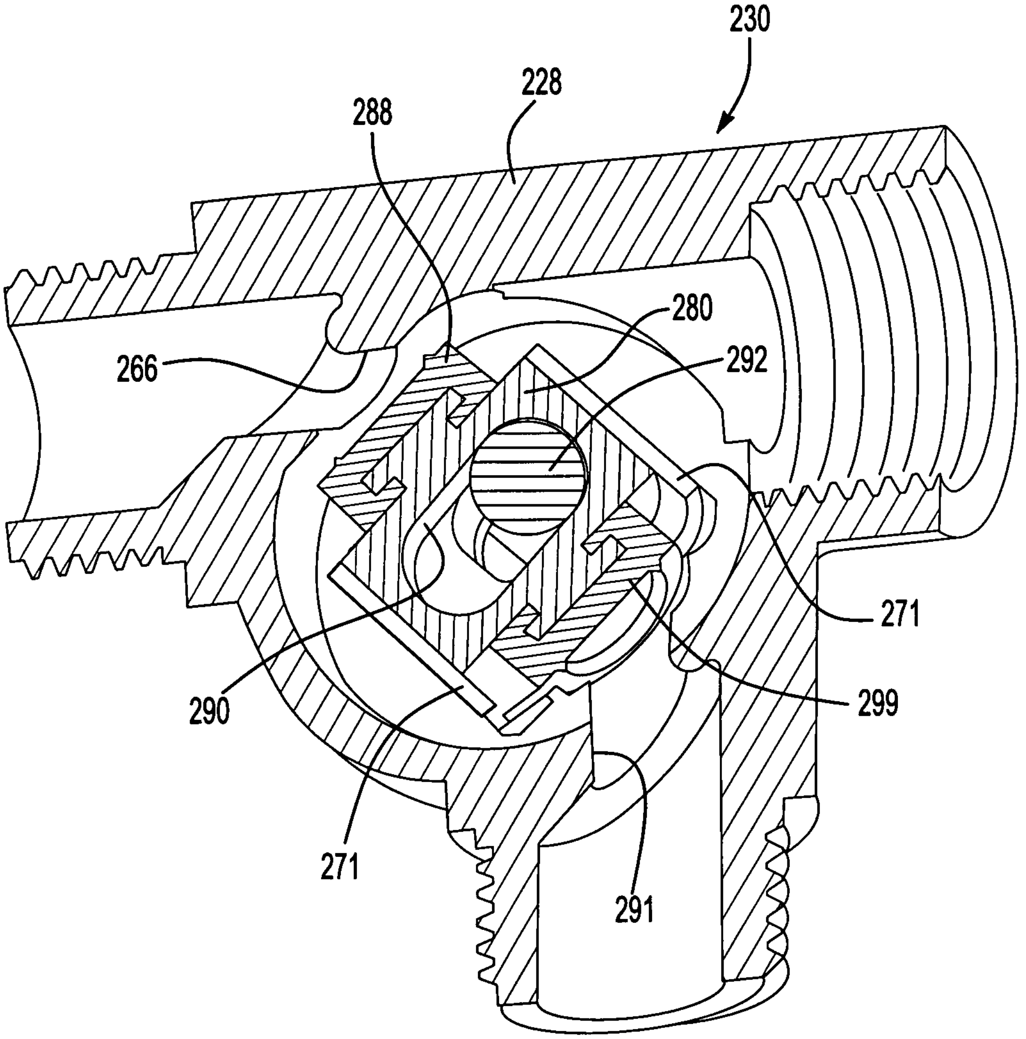
FIG. 8 is a cross-sectional view of the diverter valve in a position permitting fluid flow to the first and second outlet ports.

The embodiment shown in FIGS. 1-6C depict diverter valves with outlet ports arranged approximately 90 degrees or normal to one another. Another diverter valve 230 is shown in FIGS. 7 and 8. In this embodiment, a single cam follower 280 is used to selectively block outlet ports that are arranged approximately 180 degrees from one another. The cam follower 280 in FIG. 8 is shown with its seals 288 and 299 spaced from the openings 266 and 291 associated with the first and second outlet ports. The cam follower 280 slides against guides 271 in the housing 228 in response to rotational input from the knob 222 to the camshaft 232. Cam lobe 292, which is supported on the camshaft 232, is received in the elongated aperture 290 and configured to move the cam follower 280 between the openings 266, 291 as the camshaft 232 is rotated. Like numerals are used in the Figures for like elements previously discussed.

Although a preferred embodiment of this invention has been disclosed, a worker of ordinary skill in this art would recognize that certain modifications would come within the scope of this invention. While the example embodiments only indicate one or two cam followers, the inventive diverter valve can use more than two followers to selectively control fluid flow through more than two outlet ports. The following claims should be studied to determine the true scope and content of this invention.

What is claimed is:

1. A diverter valve for directing fluid flow comprising:

a housing having an inlet port and first and second outlet ports;

a camshaft having a rotational axis and including a cam lobe offset relative to the rotational axis and rotatable about the rotational axis with the camshaft; and a cam follower supported on the cam lobe and movable linearly along a longitudinal axis in response to rotation of the camshaft about the rotational axis to selectively block at least one of the first and second outlet ports, wherein the cam follower includes an elongated aperture engaging and fully surrounding the cam lobe.

2. A diverter valve for directing fluid flow comprising:

a housing having an inlet port and first and second outlet ports, wherein the first and second outlet ports are arranged approximately 180 degrees from one another;

a camshaft having a rotational axis and including a cam lobe offset relative to the rotational axis;

a cam follower supported on the cam lobe and movable linearly along a longitudinal axis in response to rotation of the camshaft about the rotational axis to selectively block at least one of the first and second outlet ports; and wherein the cam follower includes an elongated aperture receiving the cam lobe.

3. The diverter valve according to claim 2, wherein the cam follower includes opposing ends, one end near the first port and the other end near the second port, the ends moving linearly toward and away from the first and second ports to selectively block flow through the first and second ports.

4. The diverter valve according to claim 1, wherein a second cam follower is supported on the cam lobe and is movable in a longitudinal direction transverse relative to the longitudinal axis, the cam follower selectively blocking the first outlet port and the second cam follower selectively blocking the second outlet port.

* * * * *